Nov. 24, 1931.    W. WHITE    1,833,100
DIRIGIBLE HEADLIGHT FOR AUTOMOBILES
Filed Aug. 15, 1929    2 Sheets-Sheet 1

Inventor
Wilbur White.
By F. K. Bryant
Attorney.

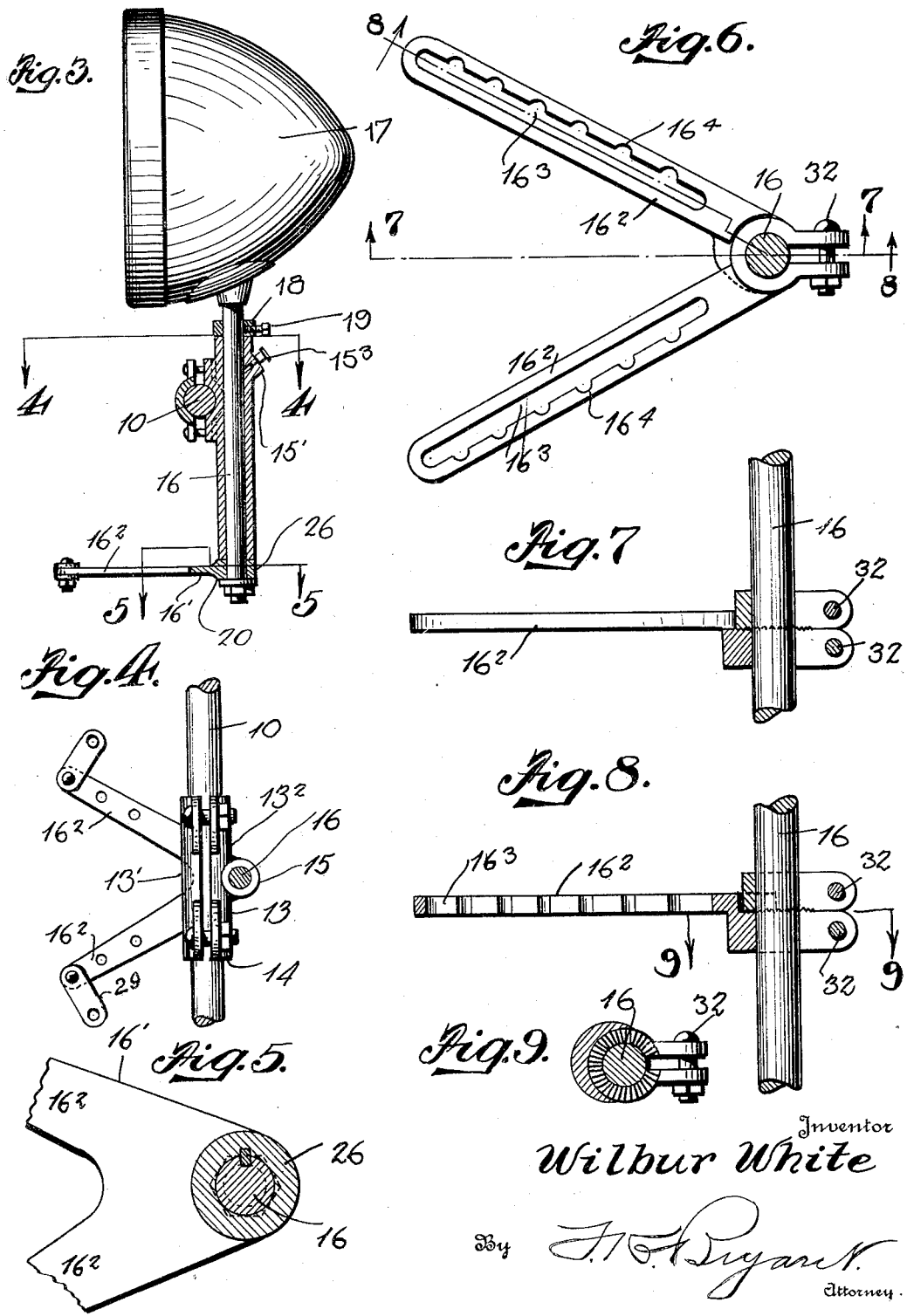

Patented Nov. 24, 1931

1,833,100

UNITED STATES PATENT OFFICE

WILBUR WHITE, OF SALAMANCA, NEW YORK

DIRIGIBLE HEADLIGHT FOR AUTOMOBILES

Application filed August 15, 1929. Serial No. 386,149.

This invention has relation to dirigible head lights for automobiles and has for its object the provision of novel and efficient means for turning the head light of a vehicle in the direction to which the vehicle is steered.

The mechanism constituting my invention comprises a post or upright shaft upon which the head light is supported, a bushing bolted to a transverse stationary rod running transversely of the vehicle a forked rod attached to the lower end of the lamp supporting post or shaft and adjustable, elastic connections between the forked rod and the stationary members of the brake drums.

The improvements consist in the construction and arrangement of parts hereinafter more fully described and set forth in the claims.

In the accompanying drawings illustrating a preferred embodiment of my invention.

Figure 3 is a vertical sectional view on the line 3—3 of Figure 2.

Figure 4 is a plan view in part section of part of the dirigible lamp mechanism.

Figure 1:
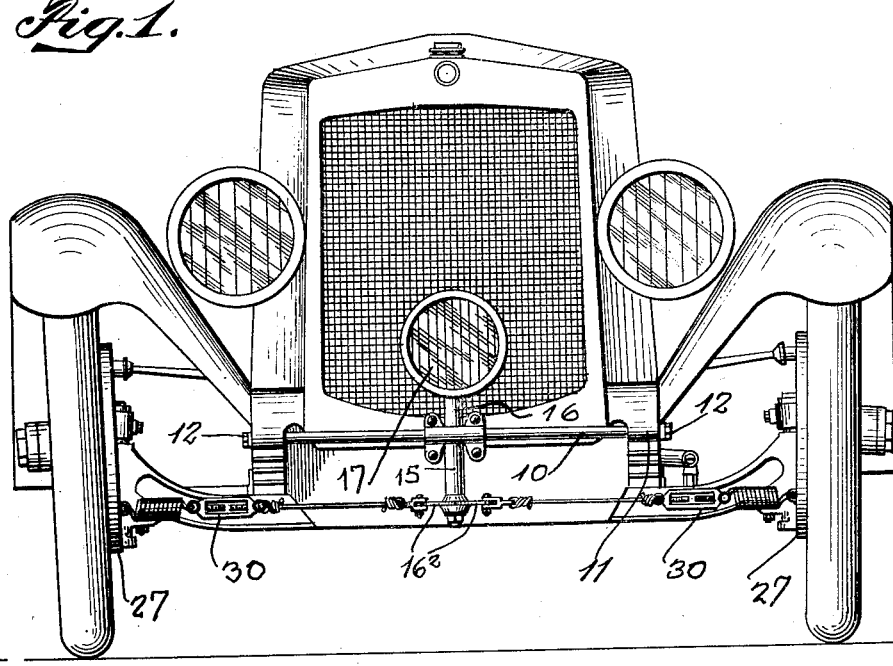
Figure 1 is a front elevation of an automobile vehicle equipped with my dirigible head light.
Figure 2:
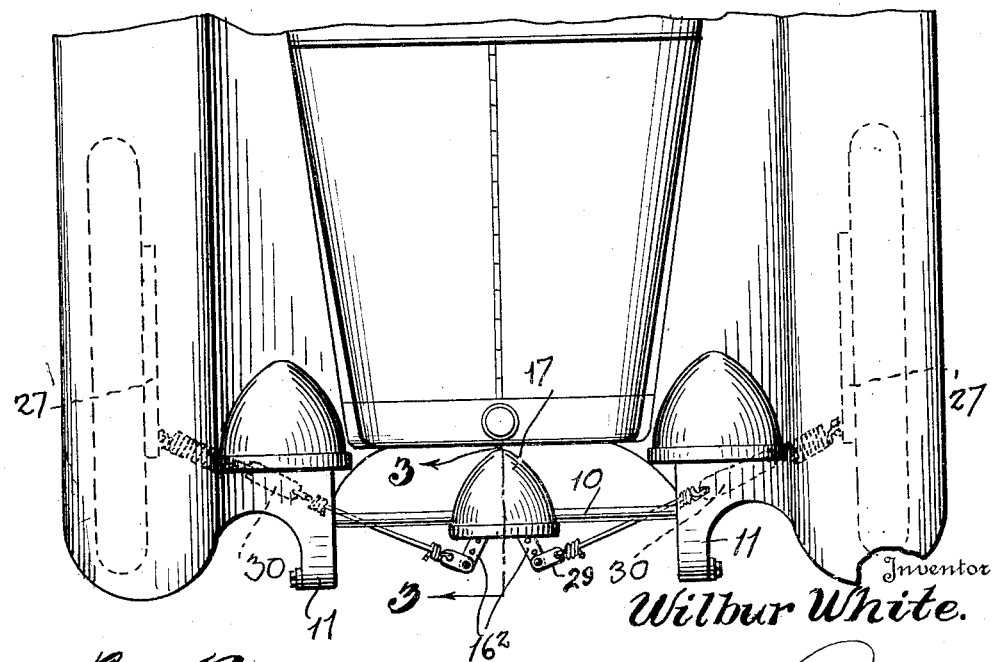
Figure 2 is a plan view of the front part of the vehicle.

Figure 5 is a transverse sectional view through the lamp carrying post or shaft on line 5—5 of Figure 3, Figure 6 is a plan view of a modified construction of the connections between the lamp carrying shaft and the brake drums, Figure 7 is a sectional view, on line 7—7 of Figure 6, Figure 8 is a sectional view on the line 8—8 of Figure 6, and Figure 9 is a horizontal sectional view on the line 9—9 of Figure 8.

The stationary support for the lamp and associated mechanism consists of the horizontal rod 10. the ends of which are rigidly connected to the springs 11 of the vehicle, by suitable nuts 12. To this rod 10 is secured a bushing 13. consisting of two semi-tubular sections 13'—$13^2$ respectively having ears 14 by which the sections are clamped and secured to the rod 10. The innermost section $13^2$ is formed with a central vertical tubular bushing element 15 through which passes the shaft 16 upon the upper end of which is mounted the lamp 17, which with the shaft 16 is rotatable horizontally, the shaft 16 being held in proper vertical position by the collar 18 and set screw 19. The lower end of the shaft 16 is threaded, and has screwed thereon a nut 19 to support the operating fork or Y 16, through which connection is made with the brake drums 27. The diverging arms $16^2$ of this fork or Y are pierced at intervals for the connection thereto of the wire cables 28—28 leading to the brake drums, the cables having attached to their inner ends the connection links 29, having holes for the passage of connecting bolts, and the attachment of the cable ends. The purpose of a plurality of holes in the arms of the Y is to provide for adjustment of the connection cables to adapt the mechanism to various requirements in vehicles of different construction, size and the like. The outer ends of the cables are attached to the stationary members of the brake drums, and such cables are provided with turn buckles 30 to lengthen or shorten the cables, and are also provided with outer terminal springs to obviate strain and provide a safe degree of resiliency.

In Figures 6 to 9 a modified construction of the Y element is illustrated, the Y arms $16^2$ being made in two separate parts having clamps 31 at their inner ends by which they are clamped to the shaft 16, by horizontal bolts 32. These clamps are offset from the planes of the Y arms and are toothed or serrated on their abutting faces to prevent accidental displacement. As will be seen these Y arms are adjustable so as to diverge more or less, and are locked in proper relative positions. The arms $16^2$ are formed with longitudinal slots $16^3$ with notches $16^4$ at one side for the reception of bolts to connect them with the cables and to permit of adjustment of said bolts to different positions, the bolts when loosened being movable through the slots to different positions. The tube 15 is formed with a boss $15^2$ having a hole leading to the interior of the tube for lubricating purposes. A stopper 15³ closes said hole.

While I have described a preferred embodiment of my invention the same may be modified in various particulars without departing from its essential character.

I claim:

1. In dirigible lamp equipment for vehicles, a lamp structure including a vertical tubular shaft, a support therefor, means for maintaining the vertical position of the shaft relative to the support, an operating element carried by the shaft and projecting in fore and aft direction of the vehicle, and dual means for removably connecting the element individually to stationary members of the vehicle brakes, said element being formed to permit removable securing of the connecting means thereto at any one of a plurality of points, said points differing in distance from the shaft axis, whereby the throw of the lamp may be adjustably regulated.

2. A structure as in claim 1 characterized in that the connecting means includes a spring section and means for adjusting the length of the means to permit the adjustable connection and provide compensating action.

In testimony whereof I affix my signature.

WILBUR WHITE.